HARRISON & METCALF.
Side-Hill Plow.

No. 10,107.

Patented Oct. 11, 1853.

UNITED STATES PATENT OFFICE.

N. HARRISON AND J. W. H. METCALF, OF RIDGEVILLE, VIRGINIA.

IMPROVEMENT IN HILLSIDE-PLOWS.

Specification forming part of Letters Patent No. 10,107, dated October 11, 1853.

*To all whom it may concern:*

Be it known that we, NATHAN HARRISON and JOHN W. H. METCALF, of Ridgeville, in the county of Hampshire and State of Virginia, have invented new and valuable Improvements to the Hillside or Right and Left Plow, being, as we think, superior to any other now in use for steep and sideling ground, and in addition works as well as almost any plow in use on flat land.

The nature of our improvement or invention consists in its superior strength, durability, and simplicity, being less complicated and not so liable to get out of order as other hillside-plows, and the construction being so simple that any country smith can make it, the entire plow being of wrought-iron, except the mold-board, which is cast.

To enable others to make and use our invention, we will proceed to describe its construction and operation.

We make the beam A about six feet long, of a bar of iron from three-fourths to seven-eighths thick and from two and one-half to four inches wide, according to the strength of team or depth we wish to plow, either for one, two, or three horses. The beam is nearly straight, say, four feet from the clevis B, and then curves to near a half-circle, and forming a point or pivot, C, at the bottom, that fits in a socket in the heel end of the landside E. The colter F is attached by a plate, being riveted or bolted on the side of the beam, and forming a socket for the colter F to pass through—say three inches by one-half or three-fourth inch. The colter should be bent a little below the beam to make it range with the center of it. In the heel of the colter is a socket, F', for the point of the landside to turn in as a pivot or hinge. The double share is screwed fast to the mold-board H, and both are bolted to the landside. The mold-board may be made of such length and width as may best suit the size required, and may be made to turn a wide or narrow furrow by lengthening or shortening the iron that attaches the heel to the landside, and also the hook a that keeps the mold-board in place. The landside, mold-board, and share I, being all firmly attached, revolve together on the hinges or pivots formed by the end of the beam and the heel of the colter. The colter is keyed in the socket F', and has small pin-holes below the beam A and a screw, J, cut on the top of the colter, above the beam, with washer and tap to make and keep all firm and tight, and by which also the pitch of the plow can be arranged to make it run deep or shallow. The handles M are bolted to the beam at one end, and are braced in the center by a rod, N, extending down to the beam A, with a socket, O, to it, that slips over the beam and is keyed. This socket may be raised or lowered on the curve of the beam to suit the desired height for the handles. The clevis B is such as is common on side-hill plows.

What we claim as our invention or improvement, and desire to secure by Letters Patent, is—

Curving downward and inward the beam in the rear part, so as to cause it to support the rotary part of the plow, which it performs in combination with the standard, in the manner and for the purposes set forth.

NATHAN HARRISON.
J. W. H. METCALF.

Witnesses:
N. KUYKENDALL,
HENRY TROUT.